(12) United States Patent
Fink et al.

(10) Patent No.: US 11,691,722 B2
(45) Date of Patent: Jul. 4, 2023

(54) MULTIROTOR AIRCRAFT THAT IS ADAPTED FOR VERTICAL TAKE-OFF AND LANDING

(71) Applicant: AIRBUS URBAN MOBILITY GMBH, Munich (DE)

(72) Inventors: Axel Fink, Donauworth (DE); Uwe Kiesewetter, Rain Am Lech (DE); Klaus Kicker, Hilgertshausen-Tandern (DE)

(73) Assignee: AIRBUS URBAN MOBILITY GMBH, Munich (DE)

( * ) Notice: Subject to any disclaimer, the term of this patent is extended or adjusted under 35 U.S.C. 154(b) by 495 days.

(21) Appl. No.: 16/701,778

(22) Filed: Dec. 3, 2019

(65) Prior Publication Data
US 2020/0269975 A1 Aug. 27, 2020

(30) Foreign Application Priority Data

Feb. 27, 2019 (EP) ..................................... 19400006

(51) Int. Cl.
*B64C 29/00* (2006.01)

(52) U.S. Cl.
CPC ...... *B64C 29/0033* (2013.01); *B64C 29/0025* (2013.01)

(58) Field of Classification Search
CPC ... B64C 29/0025; B64C 29/005; B64D 27/06; B64D 27/12; B64D 27/18
See application file for complete search history.

(56) References Cited

U.S. PATENT DOCUMENTS

| 3,089,666 A | 5/1963 | Quenzler |
| 3,262,657 A | 7/1966 | Leif |

(Continued)

FOREIGN PATENT DOCUMENTS

| CN | 201306711 Y | 9/2009 |
| CN | 202728571 U | 2/2013 |

(Continued)

OTHER PUBLICATIONS

European Search Report for European Application No. EP 19400006.3, Completed by the European Patent Office, dated Aug. 20, 2019, 16 pages.

(Continued)

*Primary Examiner* — Tien Q Dinh
*Assistant Examiner* — William L Gmoser
(74) *Attorney, Agent, or Firm* — Brooks Kushman P.C.

(57) ABSTRACT

A multirotor aircraft 10 that is adapted for vertical take-off and landing, comprising a fuselage, a thrust producing units assembly that is provided for producing thrust in operation, and a forward-swept wing that comprises a portside half wing and a starboard side half wing. Each one of the portside and starboard side half wings comprises an inboard section that is connected to the fuselage and an outboard section that forms a wing tip. The inboard sections of the portside and starboard side half wings form a central wing region. The portside and starboard side half wings are respectively connected in the region of their wing tips to an associated outboard wing pod that supports at least two non-tiltably mounted thrust producing units of the thrust producing units assembly.

18 Claims, 9 Drawing Sheets

(56) References Cited

U.S. PATENT DOCUMENTS

| | | | |
|---|---|---|---|
| 5,320,282 A * | 6/1994 | Ramerth | B64D 1/18 239/171 |
| 5,975,464 A * | 11/1999 | Rutan | B64C 39/02 244/118.2 |
| 6,568,630 B2 | 5/2003 | Yoeli | |
| 7,857,253 B2 | 12/2010 | Yoeli | |
| 7,946,528 B2 | 5/2011 | Yoeli | |
| D678,169 S | 3/2013 | Kennelly et al. | |
| 8,393,564 B2 | 3/2013 | Kroo | |
| 8,733,690 B2 | 5/2014 | Bevirt et al. | |
| 9,120,560 B1 | 9/2015 | Armer et al. | |
| 9,694,908 B2 | 7/2017 | Razroev | |
| 9,764,833 B1 | 9/2017 | Tighe et al. | |
| 9,944,386 B1 | 4/2018 | Reichert et al. | |
| 9,975,631 B1 | 5/2018 | Mclaren et al. | |
| 10,053,213 B1 | 8/2018 | Tu | |
| 10,086,931 B2 | 10/2018 | Reichert et al. | |
| 10,131,424 B2 | 11/2018 | Fink et al. | |
| 10,676,176 B1 * | 6/2020 | Piedmonte | B64C 9/02 |
| 2004/0065772 A1 * | 4/2004 | Malvestuto, Jr. | B64C 29/0025 244/12.3 |
| 2007/0034738 A1 | 2/2007 | Sanders et al. | |
| 2013/0118856 A1 | 5/2013 | Long | |
| 2014/0061367 A1 * | 3/2014 | Fink | B64C 27/26 244/6 |
| 2015/0127209 A1 | 5/2015 | Al-Garni et al. | |
| 2015/0314865 A1 | 11/2015 | Bermond et al. | |
| 2015/0314867 A1 | 11/2015 | Razroev | |
| 2016/0207625 A1 | 7/2016 | Judas et al. | |
| 2017/0305526 A1 | 10/2017 | Thomassey | |
| 2017/0369162 A1 | 12/2017 | Alzahrani | |
| 2018/0002003 A1 | 1/2018 | Won et al. | |
| 2018/0105267 A1 * | 4/2018 | Tighe | B64C 27/26 |
| 2018/0105268 A1 * | 4/2018 | Tighe | B64D 13/006 |
| 2018/0305005 A1 | 10/2018 | Parks et al. | |
| 2019/0009895 A1 | 1/2019 | Tu | |
| 2019/0092461 A1 * | 3/2019 | Duffy | B64C 27/26 |
| 2019/0337614 A1 * | 11/2019 | Villa | B64C 9/38 |
| 2021/0001979 A1 * | 1/2021 | Mikic | B64D 27/24 |

FOREIGN PATENT DOCUMENTS

| | | |
|---|---|---|
| CN | 104176250 A | 12/2014 |
| CN | 105151292 A | 12/2015 |
| CN | 105270620 A | 1/2016 |
| CN | 105346719 A | 2/2016 |
| CN | 205098474 U | 3/2016 |
| CN | 205327411 U | 6/2016 |
| CN | 205707349 U | 11/2016 |
| CN | 106516099 A | 3/2017 |
| CN | 206012959 U | 3/2017 |
| CN | 106741820 A | 5/2017 |
| CN | 206218213 U | 6/2017 |
| CN | 206427269 U | 8/2017 |
| CN | 107539472 A | 1/2018 |
| CN | 107600405 A | 1/2018 |
| CN | 207860452 U | 9/2018 |
| CN | 108860582 A | 11/2018 |
| CN | 109263967 A | 1/2019 |
| CN | 109319110 A | 2/2019 |
| DE | 102005022706 A1 | 11/2006 |
| DE | 102013108207 A1 | 2/2015 |
| EP | 2234883 A2 | 10/2010 |
| EP | 2551190 A1 | 1/2013 |
| EP | 2551193 A1 | 1/2013 |
| EP | 2551198 A1 | 1/2013 |
| EP | 2571762 A1 | 3/2013 |
| EP | 2985220 A1 | 2/2016 |
| EP | 3333072 A1 | 6/2018 |
| EP | 3366582 A1 | 8/2018 |
| GB | 905911 A | 9/1962 |
| KR | 20090101413 A | 9/2009 |
| KR | 101451646 B1 | 10/2014 |
| RU | 180474 U1 | 6/2018 |
| WO | 2009077968 A2 | 6/2009 |
| WO | 2011144696 A1 | 11/2011 |
| WO | 2013126117 A1 | 8/2013 |
| WO | 2015028627 A1 | 3/2015 |
| WO | 2015143093 A2 | 9/2015 |
| WO | 2016004852 A1 | 1/2016 |
| WO | 2017021918 A1 | 2/2017 |
| WO | 2017155348 A1 | 9/2017 |
| WO | 2018075414 A1 | 4/2018 |
| WO | 2018078388 A1 | 5/2018 |
| WO | 2018208596 A1 | 11/2018 |

OTHER PUBLICATIONS

Chinese Office Action & Search Report (with English Translation) dated Feb. 23, 2023, Application No. 201911226985.9, 18 Pages.

* cited by examiner

MULTIROTOR AIRCRAFT THAT IS ADAPTED FOR VERTICAL TAKE-OFF AND LANDING

CROSS-REFERENCE TO RELATED APPLICATIONS

This application claims priority to French patent application No. EP 19400006.3 filed on Feb. 27, 2019, the disclosure of which is incorporated in its entirety by reference herein.

BACKGROUND OF THE INVENTION

(1) Field of the Invention

The invention is related to a multirotor aircraft which is adapted for vertical take-off and landing and which comprises a thrust producing units assembly that is provided for producing thrust in operation.

(2) Description of Related Art

Various conventional multirotor aircrafts that are adapted for vertical take-off and landing (VTOL) and which are hereinafter referred to as "VTOL multirotor aircrafts" are known, e. g. from the documents EP 2 551 190 A1, EP 2 551 193 A1, EP 2 551 198 A1, EP 2 234 883 A1, EP 2 571 762 A1, EP 2 985 220 A1, WO 2015/028627 A1, WO 2016/004852 A1, WO 2017/021918 A1, WO 2017/155348 A1, WO 2018/078388 A1, U.S. Pat. Nos. 3,262,657 A, 7,857,253 B2, 7,946,528 B2, US 2007/0034738 A1, US 2017/0369162 A1, GB 905 911 A, CN 104176250 A, CN 105151292 A, CN 105270620 A, CN 105346719 A, CN 107539472 A, CN 107600405 A, CN 201306711 U, CN 202728571 U, CN 205098474 U, CN 205707349 U, CN 206012959 U, CN 206427269 U, and KR 20090101413 A. Other VTOL multirotor aircrafts are also known from the state of the art, such as e. g. the Boeing CH-47 tandem rotor helicopter, the Bell XV-3 tilt rotor aircraft, the Bell XV-22 quad tilt with ducted rotors, as well as so-called drones and, more particularly, so-called quad drones, such as e. g. described in the documents US 2015/0127209 A1, DE 10 2005 022 706 A1 and KR 101 451 646 B1. Furthermore, VTOL multirotor aircraft studies and prototypes also exist, such as e. g. the crossover-mobility vehicle Pop.Up Next from Airbus, Italdesign and Audi, the autonomous aerial vehicle Ehang 184 from Bejing Yi-Hang Creation Science & Technology Co. Ltd., the skyflyer SF MK II from Skyflyer Technology GmbH, the Quadcruiser from Airbus Group.

Each one of these VTOL multirotor aircrafts is equipped with a thrust producing units assembly having less than eight thrust producing units that are provided for producing thrust in a predetermined thrust direction during operation of the multirotor aircraft. However, studies and prototypes of VTOL multirotor aircrafts that are equipped with eight or more thrust producing units also exist, such as e. g. the multicopter Volocopter 2X from e-Volo GmbH, the Cora from Kitty Hawk Corp., the eVTOL Vahana from Airbus A3, and the Joby S2 VTOL from Joby Aviation. Still other VTOL multirotor aircrafts with eight or more thrust producing units are described in the documents WO 2013/126117 A1, WO 2015/143093 A2, DE 10 2013 108 207 A1, U.S. Pat. No. 6,568,630 B2, U.S. D678 169 S, U.S. Pat. Nos. 8,393,564 B2, 8,733,690 B2, US 2013/0118856 A1, CN 206218213 U, U.S. Pat. Nos. 9,944,386 B1, 10,086,931 B2, 9,975,631 B1, EP 3 366 582 A1, EP 3 333 072 A1, WO 2018/075414 A1, U.S. Pat. No. 3,089,666 A, WO 2018/075414 A1, and RU 180 474 U1.

More generally, mainly three different types of VTOL multirotor aircrafts are currently developed. A first VTOL multirotor aircraft type exhibits a design that may be referred to as a "conventional design". According to this conventional design, the first VTOL multirotor aircraft type is usually wingless and only equipped with thrust producing units which are rigidly attached to a respective airframe and essentially adapted for hover, but which are nevertheless also used to provide thrust in cruise forward flight operation. An example for this first VTOL multirotor aircraft type is the Volocopter 2X from e-Volo GmbH.

A second VTOL multirotor aircraft type exhibits a design that may be referred to as a "convertible design". According to this convertible design, the second VTOL multirotor aircraft type is equipped with tiltable thrust producing units which are tiltable between a first position, wherein they only produce thrust for hover, and a second position, wherein they only produce thrust for cruise operation. The second VTOL multirotor aircraft type is usually implemented in fixed-wing or tiltable-wings layout. An example for this second VTOL multirotor aircraft type in tiltable-wings layout is the eVTOL Vahana from Airbus $A^3$.

A third VTOL multirotor aircraft type exhibits a design that may be referred to as a "compound design". According to this compound design, the third VTOL multirotor aircraft type is equipped with rigidly mounted thrust producing units which are provided to produce mainly lift and which are essentially adapted for hover, and with rigidly mounted thrust producing units which are provided to produce additional forward thrust for propulsion in forward flight. The third VTOL multirotor aircraft type is usually implemented in wingless or fixed-wing layout. An example for this third VTOL multirotor aircraft type in fixed-wing layout is the Cora from Kitty Hawk Corp.

More specifically, VTOL multirotor aircrafts in compound design with fixed-wing layout advantageously combine lifting surfaces, i. e. wings, with a plurality of thrust producing units, both providing diverse lift/thrust compound characteristics. The wings are provided for generating lift during forward flight and, thus, allow for a reduction of a respective power consumption during flight. This results in a beneficial range extension for a given VTOL multirotor aircraft and improved performance characteristics of respective motors and rotors of the thrust producing units. In fact, the economic use of an available power resource for a VTOL multirotor aircraft is currently one of the major topics that impacts a general suitability of electro-mobility during flight. Hence, there actually exist various concepts with differing wing and rotor configurations. For example, a given wing that accommodates thrust producing units may be partially or wholly swept rearward or forward with respect to a lateral direction of the VTOL multirotor aircraft. Examples for a multirotor aircraft type with forward-swept wings are e. g. the Joby S2 VTOL from Joby Aviation and the VTOL multirotor aircraft described in the document WO 2015/143093 A2.

However, use of a plurality of thrust producing units that essentially produce lift on a given wing represents in any case a challenge for controllability and stability of the VTOL multirotor aircraft, even more in case of inoperability of one or more associated rotors, for the aerodynamic and structural efficiency of the aircraft and the architectural arrangement of a respective cabin, thrust producing units, lifting surfaces and batteries with respect to safety and operational requirements. This challenge consists on one hand in arranging the plurality of thrust producing units that essentially produce lift on the wing with respect to the fuselage of a given VTOL multirotor aircraft such that negative aerodynamic interactions can be avoided. On the other hand, it is imperative to ensure a safe regular or emergency operation of the aircraft, to allow for easy access to the systems and to reach excellent weight and thus mission efficiencies. By way of example, negative aerodynamic interactions of wings and thrust producing units that essentially produce lift are e. g. associated on the one hand with overlaps during hover flight, as well as wake interferences during forward flight on the other hand, hence further emphasizing a need to increase overall dimensions of the given VTOL multirotor aircraft and its corresponding total footprint.

In any case, a major drawback of conventional VTOL multirotor aircrafts consists in a lack of safe boarding zones which allow for a safe and free access, for boarding or for emergency exiting, to a respective passenger cabin of a given VTOL multirotor aircraft without exposition to adjacently arranged thrust producing units that essentially produce lift. Furthermore, in conventional VTOL multirotor aircrafts there are generally discrepancies between spread lift, as a result of a low-interactive multirotor arrangement, and centralized mass, which causes larger load levels on a respective aircraft structure and consequently reductions of the structural weight efficiency. Moreover, large overhead masses are usually created when arranging lifting surfaces such as wings and thrust producing units ahead of the fuselage, which results in a need of strong frames within the fuselage to cope with safety requirements in emergency landing or crash conditions, hence resulting in additional largely loaded structures and to an associated decrease of structural efficiency. In addition, lift or forward thrust producing units are often arranged in such a way that their respective rotor discs are impacting the aircraft's cabin, which leads to serious safety risks in blade loss scenarios, hence further requiring protection means for the passengers and further penalties in weight efficiency. Finally, many conventional VTOL multirotor aircrafts use undesirable battery locations close to the passengers within the central fuselage, i. e. behind, below or aside the cabin, which represents a serious safety penalty in case of sudden inflammation of the batteries during flight or after crash.

BRIEF SUMMARY OF THE INVENTION

Based on the limitations and drawbacks of the prior art, an object of the present invention is to provide a new multirotor aircraft that is adapted for vertical take-off and landing and that enables safe operation, in particular by providing freely and securely accessible boarding zones to passengers, whilst achieving improved structural efficiency.

This object is solved by a multirotor aircraft that is adapted for vertical take-off and landing, comprising a fuselage, a thrust producing units assembly that is provided for producing thrust in operation, and a forward-swept wing that comprises a portside half wing and a starboard side half wing, each one of the portside and starboard side half wings comprising an inboard section that is connected to the fuselage and an outboard section that forms a wing tip. The inboard sections of the portside and starboard side half wings form a central wing region. Each one of the portside and starboard side half wings is connected in the region of its wing tip to an associated outboard wing pod. Each one of the associated outboard wing pods supports at least two non-tiltably mounted thrust producing units of the thrust producing units assembly that are provided for generating lift at least during vertical taking-off and landing. The associated outboard wing pod of the portside half wing is provided with a first and a second thrust producing unit, the first thrust producing unit being arranged near a trailing edge of the portside half wing and the second thrust producing unit being arranged near a leading edge of the portside half wing. The associated outboard wing pod of the starboard side half wing is provided with a third and a fourth thrust producing unit, the third thrust producing unit being arranged near a trailing edge of the starboard side half wing and the fourth thrust producing unit being arranged near a leading edge of the starboard side half wing. A thrust producing units sub-assembly of the thrust producing units assembly is provided in the central wing region near a trailing edge of the forward-swept wing for generating lift at least during vertical taking-off and landing.

Preferably, the forward-swept wing of the inventive multirotor aircraft is non-tiltably mounted to the fuselage and connected at each wing tip via associated wing pods to at least two thrust producing units of the thrust producing units assembly that essentially produce lift, such that at least a total of four thrust producing units is arranged on the wing tips. These at least four thrust producing units are provided to mainly generate lift and other thrust producing units of the thrust producing units assembly, which form a thrust producing units sub-assembly, may be provided to additionally generate forward thrust. Each thrust producing unit may be composed of one or two (counter-rotating) propellers or rotors, coaxially arranged to each other.

The wing tips of the forward-swept wing, which is swept forward with respect to a lateral axis of the multirotor aircraft, are preferably arranged in height direction of the multirotor aircraft at a height that is above a lower region of the fuselage. The lower region of the fuselage is preferably mounted to the central wing region of the forward-swept wing, i. e. to the inboard sections of the forward-swept wing. This configuration allows the forward-swept wing and the central wing region of the forward-swept wing to pass below a cabin of the multirotor aircraft. Accordingly, the multirotor aircraft may be considered as a low-wing aircraft, i. e. as an aircraft with a low-wing arrangement.

Advantageously, with respect to the fuselage of the multirotor aircraft, the low-wing arrangement may eliminate overhead masses (wing, thrust producing units and other system items allocated within the wings) above the cabin of the multirotor aircraft in contrast to so-called shouldered wing configurations. This may enable avoidance of strong and heavy cabin frames around the entire cabin perimeter which are mandatory for mass retention capabilities in case of an emergency landing and crash scenarios.

More specifically, the low-wing arrangement may allow an easy access to the batteries and motors of the thrust producing units assembly. Furthermore, the low-wing arrangement of the inventive multirotor aircraft may at least provide an improved upward visibility in climb and axial visibility in turn, however, at the possible expense of a reduced visibility in descent. Moreover, the low-wing arrangement of the multirotor aircraft may enable adjustment of a large track and short length of associated landing gears without extra weight. This configuration may result in an improved ground stability behavior and in a reduction of the structural loads during a hard landing case.

Preferably, the inboard sections of the portside and starboard side half wings extend parallelly with respect to the lateral axis of the multirotor aircraft. The outboard sections of the portside and starboard side half wings may be upwardly inclined with respect to the lateral axis of the multirotor aircraft by a predetermined positive dihedral angle. This configuration may result in the wing tips of the forward-swept wing being arranged in the height direction of the multirotor aircraft at a height that corresponds to an upper region of the fuselage of the multirotor aircraft.

The inboard sections of the portside and starboard side half wings may have larger wing chords than the outboard sections of the portside and starboard side half wings. More particularly, the inboard sections and outboard sections of the portside and starboard side half wings respectively define associated chord lines. The chord lines of the outboard sections may be forwardly angled by a forward sweep angle with respect to the lateral axis of the multirotor aircraft, wherein the forward sweep angle is greater than respective sweep angle of the chord lines of the inboard sections. The respective sweep angle of the chord lines of the inboard sections may be positive of negative.

Each one of the portside and starboard side half wings preferably comprises a transition region that interconnects its inboard and outboard sections. Preferably, an inboard wing pod is arranged at each transition region and the thrust producing units of the thrust producing units sub-assembly may be mounted thereon. The inboard wing pods may further or alternatively accommodate landing gears of the multirotor aircraft, which are preferably of the non-retractable wheeled type. Furthermore, at least one rotor disc associated with one of the thrust producing units of the thrust producing units sub-assembly may be arranged at a lower region of the fuselage, which also defines a lower region of the cabin of the multirotor aircraft.

Preferably, the thrust producing units sub-assembly is arranged near the trailing edge of the forward-swept wing which is preferably arranged on an opposite side of the boarding zone of the multirotor aircraft. In a configuration in which the boarding zone of the multirotor aircraft is arranged near the trailing edge of the forward-swept wing, the thrust producing units sub-assembly may be arranged near the leading edge of the forward-swept wing.

Furthermore, as already mentioned above, the first, second, third and fourth thrust producing units of the thrust producing units assembly are preferably arranged at the wing tips of the portside and starboard side half wings. More specifically, the first, second, third and fourth thrust producing units may be mounted to associated outboard wing pods that are arranged at the wing tips of the portside and starboard side half wings. Rotor discs of the first, second, third and fourth thrust producing units may be arranged in height direction of the multirotor aircraft at a height that is greater than an uppermost region of the cabin of the multirotor aircraft. Furthermore, batteries of the first, second, third and fourth thrust producing units may be accommodated within the outboard wing pods.

More particularly, the first, second, third and fourth thrust producing units may be arranged in the height direction of the multirotor aircraft with respect to the lower region of the fuselage at a height that is greater than the uppermost region of the cabin of the multirotor aircraft as a result of the predetermined positive dihedral angles of the portside and starboard side half wings and, more particularly, of the outboard sections of the portside and starboard side half wings. This configuration may provide a boarding zone of the multirotor aircraft that is completely free from an obstructive and life-threatening thrust producing units arrangement. Therefore, the multirotor aircraft may assure a high level of safety for boarding and in case of emergency exit.

More specifically, due to the height of the first, second, third, and fourth thrust producing units with respect to the lower region of the fuselage, the fuselage may be settled closer to the ground for facing a required clearance in order to avoid striking of the wing tips on the ground, e. g. in comparatively bad landing conditions. This configuration may also allow a large crushable area for improving crashworthiness between the lower region of the fuselage, the central wing region, and the thrust producing units sub-assembly. However, size and weight of the preferably wheeled landing gear may be kept low as a result of a low distance between the fuselage, the thrust producing units sub-assembly, and the ground.

Advantageously, there may be a balance of lift with respect to the multirotor aircraft's center of gravity for attaining flight stability. More specifically, during vertical flight or hover, lift may be generated by the first to fourth thrust producing units of the thrust producing units assembly, whereas during forward flight lift may alternatively or in addition be provided by the forward-swept wing. A respective balance between lift provided simultaneously by the forward-swept wing and the first to fourth thrust producing units must be achieved in both flight scenarios with respect to the centers of lift by the amount of lift at the forward-swept wing, the thrust producing units of the thrust producing units assembly that essentially produce lift and the center of gravity of the multirotor aircraft. Therefore, flight stability may be achieved by arranging some of the thrust producing units of the thrust producing units assembly that essentially produce lift in longitudinal direction of the multirotor aircraft ahead of the forward-swept wing and some of the thrust producing units of the thrust producing units assembly behind the wing. This configuration may provide the forward-swept wing with a convenient planform.

Preferably, each one of the outboard sections may be forwardly angled by a sweep angle with respect to the lateral axis of the multirotor aircraft for ensuring flight stability in case that the thrust producing units of the thrust producing units sub-assembly that essentially produce lift is arranged at the inboard section near the trailing edge of the forward-swept wing. Furthermore, rotor discs of the thrust producing units that essentially produce lift may be arranged at the lower region of the fuselage, which also defines the lower region of the cabin of the fuselage, where the central wing region is preferably arranged. Therefore, occupants and critical equipment of the multirotor aircraft will advantageously not be impacted in case of a rotor burst of the thrust producing units sub-assembly.

The central wing region preferably interconnects the inboard sections of the portside and starboard side half wings by means of at least one continuous main spar. The latter may be housed within the lower region of the fuselage only and preferably acts as a crushing structure in a crash scenario. A front masking surface of the fuselage may advantageously be reduced to a minimum and an available cabin volume of the multirotor aircraft may be maximized by accommodating the thrust producing units assembly in the outboard and inboard wing pods.

More specifically, big masses of the multirotor aircraft such as the thrust producing units, the batteries of the thrust producing units, the landing gears, and the passengers may be distributed along a span of the forward-swept wing instead of being concentrated close to the center of gravity of the multirotor aircraft. This may in fact be a logical and advantageous consequence of the distributed lift characteristics of the multirotor aircraft. The best structural efficiency may be achieved by allocating the mass close to the lift, which means to distribute the mass in the same manner as the lift is being distributed. As a consequence, both lift and mass are allocated in conjunction at the lower region of the fuselage, at the center of the fuselage, the mid portion of the wings and at the wing tips. In contrast to conventional winged non-electrical vehicles, the fuel may not change weight and affect the balance of the center of gravity of the vehicle over the flight time. Therefore, an allocation of the batteries of the thrust producing units assembly may be chosen so as to advantageously define convenient balance characteristics. The wing pods and the tail boom may be used to house the batteries and the landing gear. Furthermore, arranging the batteries at least partially away from the fuselage is deemed to be advantageous in terms of cooling capabilities of the batteries and protection of passengers from burning in case of a crash scenario.

According to one aspect, each one of the portside and starboard side half wings comprises a transition region that interconnects its inboard and outboard sections and that is connected to an associated inboard wing pod, wherein the central wing region comprises both the transition region of the portside half wing and the transition region of the starboard side half wing, wherein the associated inboard wing pod of the portside half wing is provided with a non-tiltably mounted first thrust producing unit of the thrust producing units sub-assembly that is arranged near the trailing edge of the portside half wing, and wherein the associated inboard wing pod of the starboard side half wing is provided with a non-tiltably mounted second thrust producing unit of the thrust producing units sub-assembly that is arranged near the trailing edge of the starboard side half wing.

According to one aspect, the thrust producing units sub-assembly comprises a non-tiltably mounted fifth thrust producing unit that is arranged on a longitudinal axis of the aircraft in the central wing region near a trailing edge of the forward-swept wing.

According to one aspect, the outboard section of the portside half wing is upwardly inclined by a predetermined positive dihedral angle relative to the inboard section of the portside half wing, and the outboard section of the starboard side half wing is upwardly inclined by the predetermined positive dihedral angle relative to the inboard section of the starboard side half wing.

According to one aspect, the predetermined positive dihedral angle has a value that lies in a range from 0° to 60°.

According to one aspect, the inboard section of the portside half wing and the inboard section of the starboard side half wing are connected to the fuselage at a lower region of the fuselage, wherein the wing tips of the portside half wing and the starboard side half wing are in height direction of the multirotor aircraft arranged at a height that corresponds to an upper region of the fuselage.

According to one aspect, the wing tips of the portside half wing and the starboard side half wing are connected to winglets.

According to one aspect, at least the first and third thrust producing units and/or at least one thrust producing unit of the thrust producing units sub-assembly are provided with associated shroudings.

According to one aspect, at least one of the associated shroudings is a partial shrouding.

According to one aspect, the associated shroudings are formed by the forward-swept wing.

According to one aspect, at least one thrust producing unit of the thrust producing units assembly is fixedly inclined with respect to a length direction of the multirotor aircraft for generating forward thrust at least during cruise operation of the multirotor aircraft.

According to one aspect, the multirotor aircraft further comprises an empennage, wherein the at least one thrust producing unit of the thrust producing units assembly that is fixedly inclined with respect to the length direction of the multirotor aircraft is non-tiltably mounted to the empennage.

According to one aspect, the multirotor aircraft further comprises a tail boom that is connected to the fuselage, wherein the empennage is mounted to the tail boom.

According to one aspect, the multirotor aircraft further comprises lateral booms that form the associated inboard wing pods of the portside half wing and the starboard side half wing, wherein the empennage is mounted to the lateral booms.

According to one aspect, the multirotor aircraft further comprises lateral booms that form the associated outboard wing pods of the portside half wing and the starboard side half wing, wherein the empennage is mounted to the lateral booms.

According to one aspect, the multirotor aircraft is adapted for transportation of passengers.

Advantageously, the inventive multirotor aircraft is not only designed for transportation passengers, but is, in particular, suitable and adapted for being certificated for operation within urban areas. Furthermore, the inventive multirotor aircraft is preferably capable of hovering and comprises a distributed propulsion system. Moreover, the inventive arrangement of the lift producing units allows a reduction of negative interactional effects between front and rear parts of the inventive multirotor aircraft significantly.

It should be noted that reference to rotors or rotor structures in the present description should likewise be understood as a reference to propellers and propeller structures, so that the inventive multirotor aircraft can likewise be implemented as a multipropeller and/or multipropeller and -rotor aircraft.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
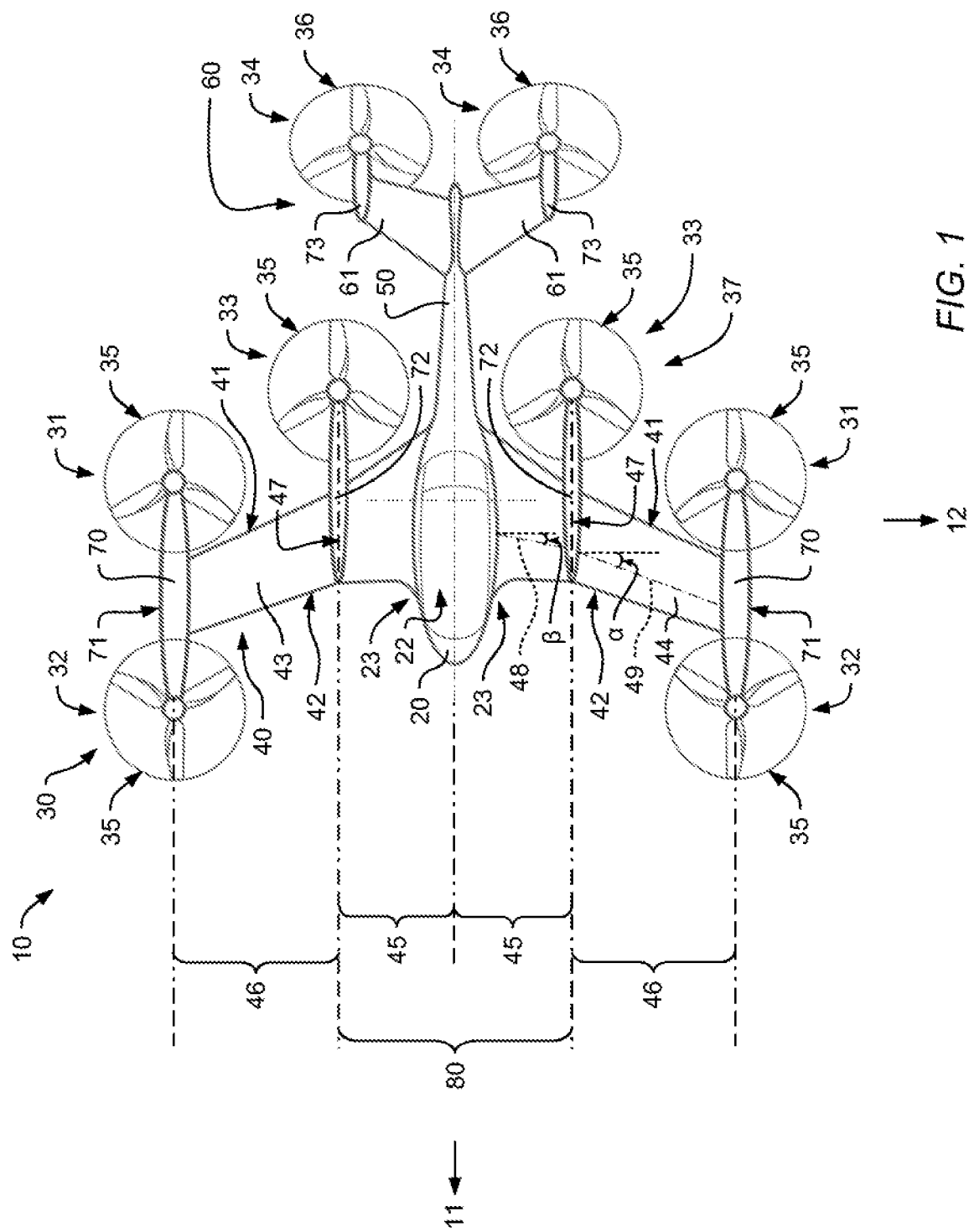
FIG. 1 shows a top view of a multirotor aircraft with a thrust producing units assembly and a wing in accordance with some embodiments.

FIG. 1 shows an exemplary multirotor aircraft 10 that is adapted for vertical take-off and landing and, therefore, provided with a thrust producing units assembly 30 that produces thrust for producing lift and forward thrust in operation. The multirotor aircraft 10 is hereinafter referred to as the "VTOL multirotor aircraft 10".

Figure 2:
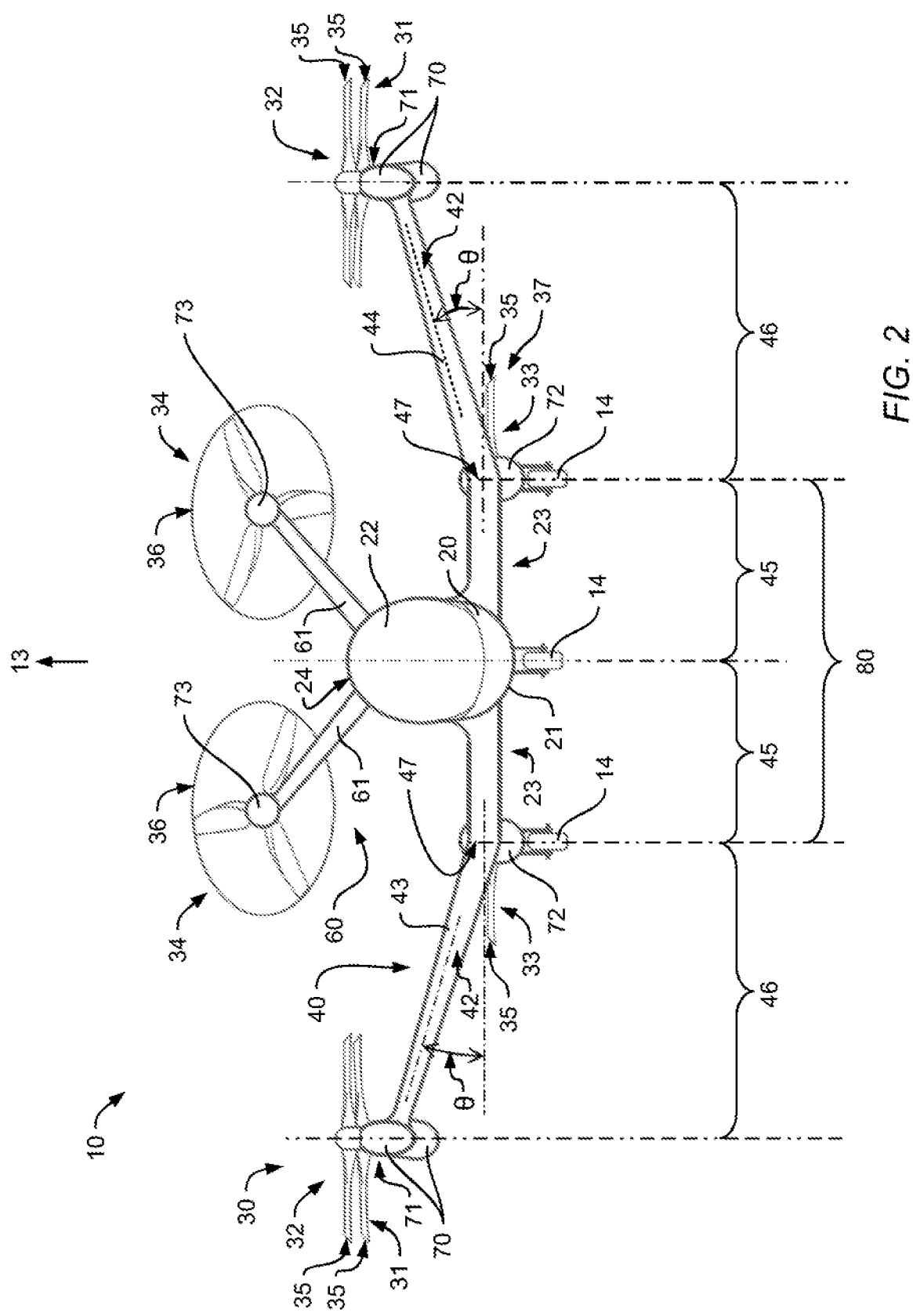
FIG. 2 shows a front view of the multirotor aircraft of FIG. 1 with the thrust producing units assembly and the wing.

According to one aspect, the VTOL multirotor aircraft 10 is adapted for transportation of passengers and illustratively comprises a fuselage 20 that forms a cabin (22 in FIG. 2). The fuselage 20 may be connected to any suitable undercarriage, such as e. g. a skid- or wheel-type landing gear (e. g. landing gear 14 in FIG. 2). By way of example, a single tail boom 50 is connected to and, thus, extends from the fuselage 20 and an empennage 60 is provided at an aft portion of the tail boom 50 and mounted to the tail boom 50.

More specifically, the fuselage 20 preferably defines a boarding zone 23 that is at least adapted to enable an easy and secure boarding of passengers. The fuselage 20 defines a supporting structure that has illustratively an extension in length direction along a longitudinal axis 11, which also exemplarily indicates a forward flight direction of the VTOL multirotor aircraft 10, an extension in width direction along a lateral axis 12, and an extension in height direction along a vertical axis (13 in FIG. 2 and FIG. 3) that also exemplarily indicates a vertical take-off direction of the VTOL multirotor aircraft 10.

According to one aspect, the VTOL multirotor aircraft 10 comprises a forward-swept wing 40 that is illustratively formed by a portside half wing 43 and a starboard side half wing 44. The forward-swept wing 40 and, thus, each one of the portside and starboard side half wings 43, 44 has a trailing edge 41 and a leading edge 42.

More specifically, each one of the portside and starboard side half wings 43, 44 extends from the fuselage 20 in the width direction 12 and respectively comprises an inboard section 45 that is connected to the fuselage 20 and an outboard section 46 that forms a wing tip 71. Illustratively, the inboard sections 45 of the portside and starboard side half wings 43, 44 form together a central wing region 80. The inboard sections 45 may have a greater wing chord than the outboard sections 46.

The inboard sections 45 and outboard sections 46 of the portside and starboard side half wings 43, 44 are illustrated with associated quarter chord lines 48, 49. The quarter chord line 48 of each one of the inboard sections 45 of the portside and starboard side half wings 43, 44 may be forwardly angled by a positive sweep angle $\beta$ with respect to the lateral axis 12 of the VTOL multirotor aircraft 10. The quarter chord line 49 of each one of the outboard sections 46 of the portside and starboard side half wings 43, 44 is preferably forwardly angled by a positive sweep angle $\alpha$ with respect to the lateral axis 12 of the VTOL multirotor aircraft 10. The sweep angle $\alpha$ of the outboard sections 46 may be greater than the sweep angle $\beta$ of the inboard sections 45. The positive sweep angles $\alpha$, $\beta$ define the forward sweep of the forward-swept wing 40, which may be used advantageously to achieve flight stability.

According to one aspect, each one of the portside and starboard side half wings 43, 44 is connected in the region of its wing tip 71 to an associated outboard wing pod 70. Each one of the outboard wing pods 70 preferably supports two non-tiltably mounted thrust producing units 31, 32 of the thrust producing units assembly 30.

Preferably, a first thrust producing unit 31 is arranged near the trailing edge 41 of the portside half wing 43, preferentially behind the trailing edge 41 of the portside half wing 43, and a first thrust producing unit 32 is arranged near the leading edge 42 of the portside half wing 43, preferentially in front of the leading edge 42 of the portside half wing 43. Likewise, a second thrust producing unit 31 is arranged near the trailing edge 41 of the starboard side half wing 44, preferentially behind the trailing edge 41 of the starboard side half wing 44, and a second thrust producing unit 32 is arranged near the leading edge 42 of the starboard side half wing 44, preferentially in front of the leading edge 42 of the starboard side half wing 44. The thrust producing units 31, 32 are preferably provided for essentially generating lift at least during vertical taking-off and landing of the VTOL multirotor aircraft 10.

According to one aspect, the thrust producing units assembly 30 comprises a thrust producing units sub-assembly 37. The thrust producing units sub-assembly 37 is preferably provided in the central wing region 80 near the trailing edge 41 of the forward-swept wing 40 for essentially generating lift at least during vertical take-off and landing of the VTOL multirotor aircraft 10.

Illustratively, each one of the portside and starboard side half wings 43, 44 comprises a transition region 47 that interconnects its inboard and outboard sections 45, 46. Each transition region 47 may be connected to an inboard wing pod 72. According to one aspect, the central wing region 80 comprises the transition region 47 of the portside half wing 43 and the transition region 47 of the starboard side half wing 44.

Preferably, the inboard wing pod 72 of the portside half wing 43 supports a first thrust producing unit 33 of the thrust producing units sub-assembly 37. This first thrust producing unit 33 is preferentially non-tiltably mounted to the inboard wing pod 71 of the portside half wing 43 and arranged near the trailing edge 41 of the portside half wing 43, preferably behind the trailing edge 41, and is intended to mainly generating lift. Likewise, the inboard wing pod 72 of the starboard side half wing 44 supports a second thrust producing unit 33 of the thrust producing units sub-assembly 37. This second thrust producing unit 33 is preferentially non-tiltably mounted to the inboard wing pod 71 of the starboard side half wing 44 and arranged near the trailing edge 41 of the starboard side half wing 44, preferably behind the trailing edge 41.

According to one aspect, the thrust producing units 31, 32, and 33 comprise associated rotor blades which define respective rotor discs 35 in rotation, which are at least essentially arranged in parallel to a plane defined by the longitudinal axis 11 and the lateral axis 12 of the VTOL multirotor aircraft 10 such that the thrust producing units 31, 32, and 33 may essentially generate lift at least during vertical take-off and landing of the VTOL multirotor aircraft 10. Preferably, additional thrust producing units 34 are provided for generating forward thrust at least during cruise operation of the VTOL multirotor aircraft 10, as described hereinafter.

More specifically, according to one aspect the empennage 60 comprises rear planes 61 that are connected to rear wing pods 73. Each one of the rear wing pods 73 may support an associated thrust producing unit 34 of the thrust producing units assembly 30 that comprises rotor blades which define respective rotor discs 36 in rotation. Preferably, the respective rotor discs 36 and, thus, the thrust producing units 34 are fixedly inclined with respect to the length direction 11 of the VTOL multirotor aircraft 10 and non-tiltably mounted to the empennage 60.

FIG. 2 shows the VTOL multirotor aircraft 10 of FIG. 1 with the thrust producing units assembly 30 that comprises the thrust producing units sub-assembly 37, as well as with the fuselage 20 and the empennage 60 with the rear planes 61, for further illustrating configuration of the VTOL multirotor aircraft 10 in height direction 13. The VTOL multirotor aircraft 10 illustratively comprises the boarding zone 23 that is at least adapted for boarding of passengers to a cabin 22 that is formed by the fuselage 20. Illustratively, a landing gear 14 is connected to the fuselage 20 and to the wing 40 at a lower region 21 of the VTOL multirotor aircraft 10. The landing gear 14 is exemplarily embodied as a wheel-type landing gear.

The VTOL multirotor aircraft 10 further comprises the forward-swept wing 40 of FIG. 1, which extends along the lateral axis 12 of the VTOL multirotor aircraft 10 and comprises the portside half wing 43 and the starboard side half wing 44. Each one of the portside and starboard side half wings 43, 44 comprises an inboard section 45 that is connected to the fuselage 20 and an outboard section 46 that forms a wing tip 71. Each one of the portside and starboard side half wings 43, 44 comprises a transition region 47 that interconnects its inboard and outboard sections 45, 46. The inboard sections 45 of the portside and starboard side half wings 43, 44 form together the central wing region 80 and are, preferably, connected to the lower region 21 of the VTOL multirotor aircraft 10.

Preferably, the outboard section 46 of the portside half wing 43 is upwardly inclined by a predetermined positive dihedral angle θ relative to the inboard section 45 of the portside half wing 43. In other words, the portside half wing 43 may be bended in upward direction, i. e. may have a kink, at its transition region 47 such that its wing tip 71 is positioned higher than its inboard section 45. Likewise, the outboard section 46 of the starboard side half wing 44 is preferably upwardly inclined by the predetermined positive dihedral angle θ relative to the inboard section 45 of the starboard side half wing 44. In other words, the starboard side half wing 44 may be bended in upward direction, i. e. may have a kink, at its transition region 47 such that its wing tip 71 is positioned higher than its inboard section 45.

Preferably, the wing tips 71 of the portside and starboard side half wings 43, 44 are arranged in the height direction 13 at a height that corresponds at least to a height of an upper region 24 of the fuselage 20. This can be achieved by a suitable selection of the predetermined positive dihedral angle θ. The predetermined positive dihedral angle θ preferentially has a value that lies in a range from 0° to 60°.

More specifically, at least the rotor discs 35 of the thrust producing units 31, 32 supported by the outboard wing pods 70 at the wing tips 71 are preferably in the height direction 13 at the height that corresponds at least to the height of the upper region 24 of the fuselage 20. Preferentially, the rotor discs 35 are arranged in the height direction 13 above the outboard wing pods 70, i. e. above the forward-swept wing 40.

The rotor discs 35 of the thrust producing units 31, 32, and 33, as well as the rotor discs 36 of the thrust producing units 34, which are pre-inclined and fixedly-mounted to the empennage 60, exemplify a preferred position and orientation of the thrust producing units 31, 32, 33, and 34 with respect to the portside half wing 43, the starboard side half wing 44, the inboard wing pods 72, the outboard wing pods 70 and the rear wing pods 73. This preferred position and orientation of the thrust producing units 31, 32, 33, and 34 advantageously enables provision of a large undisturbed boarding zone, i. e. the boarding zone 23, in front of the multirotor aircraft 10 near the leading edge 42 of the forward-swept wing 40.

According to one aspect, outboard wing pods 70, inboard wing pods 72 and/or rear wing pods 73 accommodate batteries for a power supply of thrust producing units 31, 32, 33 and 34. The inboard wing pods 72 may alternatively, or in addition, also accommodate parts of the landing gear 14 of the VTOL multirotor aircraft 10.

It should be noted that a particular configuration of the outboard wing pods 70, inboard wing pods 72, and rear wing pods 73 as well as any components accommodated therein may be determined such that comparatively big masses, which are a major structural concern in aircraft design, are distributed along a span of the forward-swept wing 40 instead of being concentrated close to a center of gravity of the VTOL multirotor aircraft 10. A suitable determination is, however, not described in detail, as it is considered to be general knowledge of the person skilled in the art.

According to one aspect, the rear planes 61 of the empennage 60 are inclined with respect to the height direction 13 of the VTOL multirotor aircraft 10. Illustratively, the rear planes 61 form a V-tail that may produce less drag and weight compared to other conventional empennage configurations. However, it should be noted that alternative configurations of the rear planes 61 are likewise contemplated, such as e. g. an inverted V-tail, T-tail, cruciform, etc.

Figure 3:
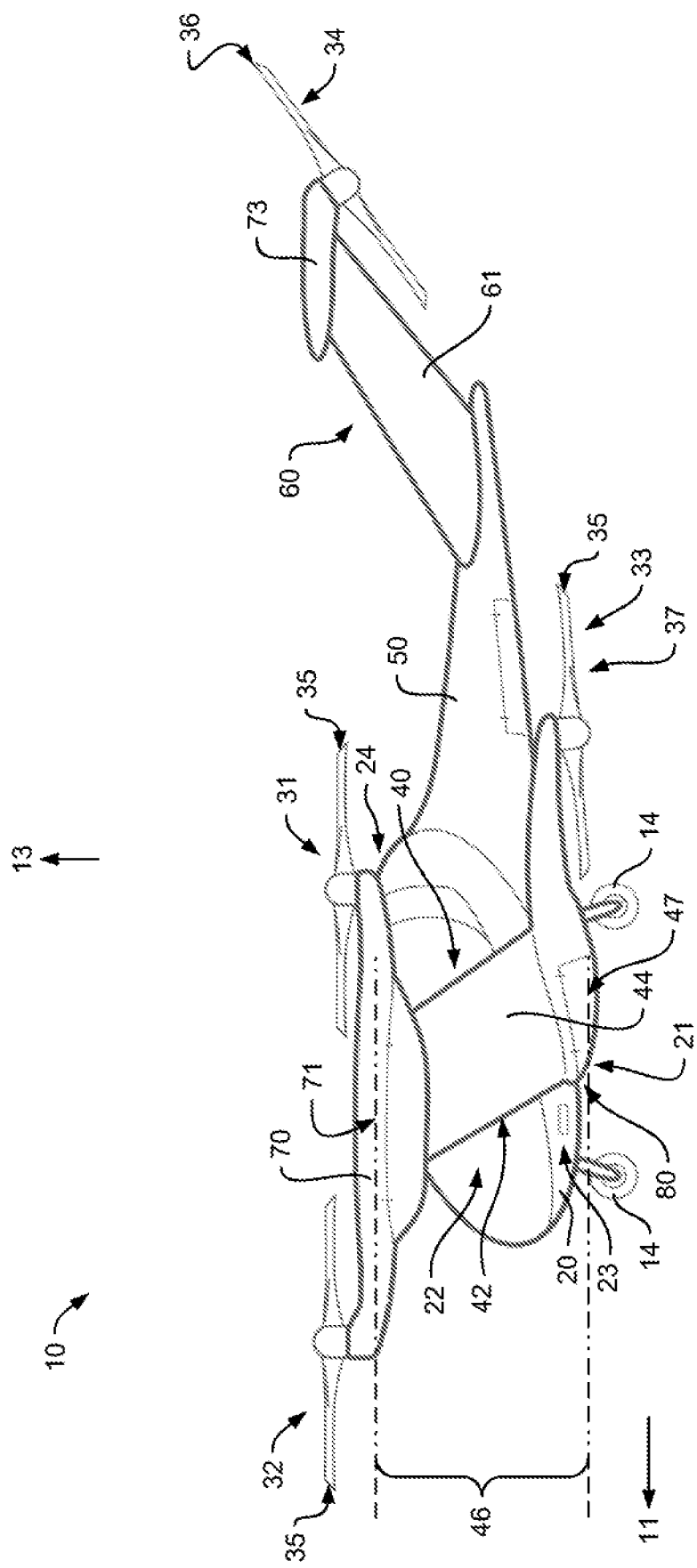
FIG. 3 shows a side view of the multirotor aircraft of FIG. 1 and FIG. 2 with the thrust producing units assembly and the wing.

FIG. 3 shows the VTOL multirotor aircraft 10 of FIG. 1 and FIG. 2 with the fuselage 20 and the boarding zone 23 that is at least adapted for boarding of passengers, as well as the landing gear 14 that is connected to the lower region 21 of the VTOL multirotor aircraft 10. The VTOL multirotor aircraft 10 comprises the thrust producing units assembly 30 with the thrust producing units sub-assembly 37, the forward-swept wing 40, from which only the starboard side half wing 44 is visible, the single tail boom 50 and the empennage 60 that is mounted to the aft portion of the tail boom 50.

More specifically, FIG. 3 further illustrates arrangement of the rotor discs 35 of the thrust producing units 31, 32 supported by the outboard wing pods 70 at the wing tips 71 in the height direction 13 at the height that corresponds at least to the height of the upper region 24 of the fuselage 20. In particular, arrangement of the rotor discs 35 in the height direction 13 above the outboard wing pods 70, i. e. above the forward-swept wing 40, is shown. This arrangement enables provision of the boarding zone 23 such that it is free of obstructive and possibly life-threatening components associated with the thrust producing units assembly 30. Therefore, the VTOL multirotor aircraft 10 assures a high level of safety for boarding and in case of emergency.

Moreover, an exemplary arrangement of the thrust producing unit 33 of the thrust producing units sub-assembly 37 is further illustrated. More specifically, the thrust producing unit 33, which is preferably arranged near the trailing edge 41 of the forward-swept wing 40 and supported by the inboard wing pod 72 provided in the transition region 47 of the starboard side half wing 44, is preferentially arranged below the starboard side half wing 44. More particularly, the thrust producing unit 33 is preferably arranged in the height direction 13 at a height that corresponds at most to a height of the lower region 21 of the fuselage 20.

Furthermore, the inclination of the rotor discs 36 of the thrust producing units 34 and, thus, of the thrust producing units 34 as such, which are fixedly inclined with respect to the length direction 11 of the VTOL multirotor aircraft 10 and non-tiltably mounted to the empennage 60, is further illustrated. Thus, it is clear that the thrust producing units 34 are essentially used to produce forward thrust for forward flight in operation of the VTOL multirotor aircraft 10.

Figure 4:
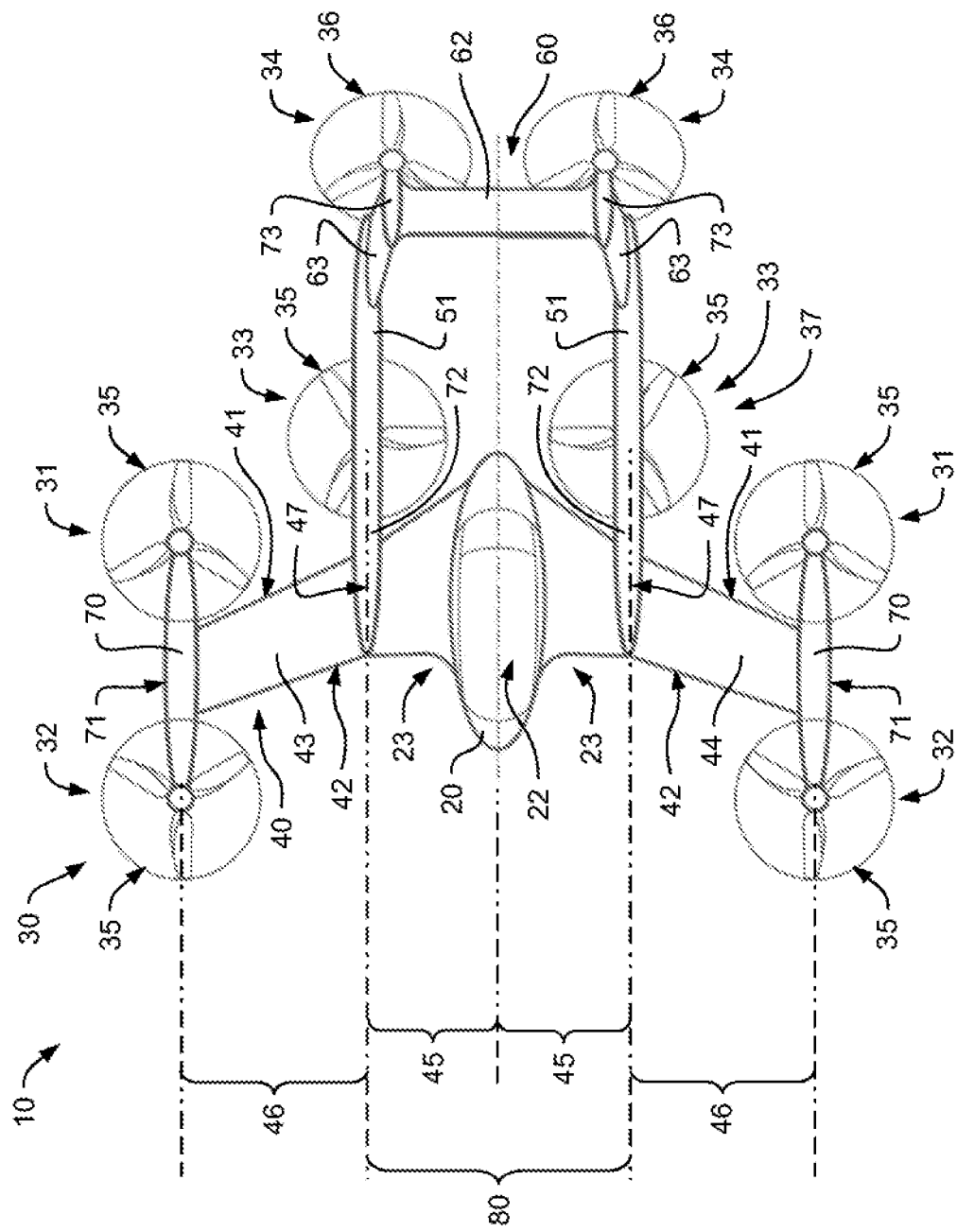
FIG. 4 shows a top view of a multirotor aircraft with a thrust producing units assembly and a wing in accordance with some embodiments.

FIG. 4 shows the VTOL multirotor aircraft 10 of FIG. 1 to FIG. 3 with the fuselage 20, the thrust producing units assembly 30 that comprises the thrust producing units sub-assembly 37, the forward-swept wing 40 that comprises the portside half wing 43 and the starboard side half wing 44, and the empennage 60. Each one of the portside and starboard side half wings 43, 44 comprises inboard and outboard sections 45, 46, which are respectively interconnected at associated transition regions 47. The fuselage 20 forms the cabin 22, adjacent to which the boarding zone 23 is provided.

However, in contrast to FIG. 1 to FIG. 3, the VTOL multirotor aircraft 10 is now exemplarily provided with two lateral booms 51 instead of the single tail boom 50 of FIG. 1 to FIG. 3. Accordingly, the empennage 60 is now exemplarily mounted to the two lateral booms 51.

More specifically, a first one of the lateral booms 51 is illustratively mounted to the transition region 47 of the portside half wing 43 and a second one of the lateral booms 51 is illustratively mounted to the transition region 47 of the starboard side half wing 44. The lateral booms 51 exemplarily implement the inboard wing pods 72 that are provided at the transition regions 47 according to FIG. 1 to FIG. 3. Accordingly, the lateral booms 51 preferably support the thrust producing units 33 of the thrust producing units sub-assembly 37, which are illustratively arranged below the lateral booms 51.

Furthermore, each one of the lateral booms 51 is preferably connected to an associated vertical rear plane 63, which is preferentially provided at a respective aft portion of the corresponding one of the lateral booms 51 and connected to an associated one of the rear wing pods 73, which supports one of the thrust producing units 34. The vertical rear planes 63 are preferably interconnected by means of a horizontal rear plane 62.

Figure 5:
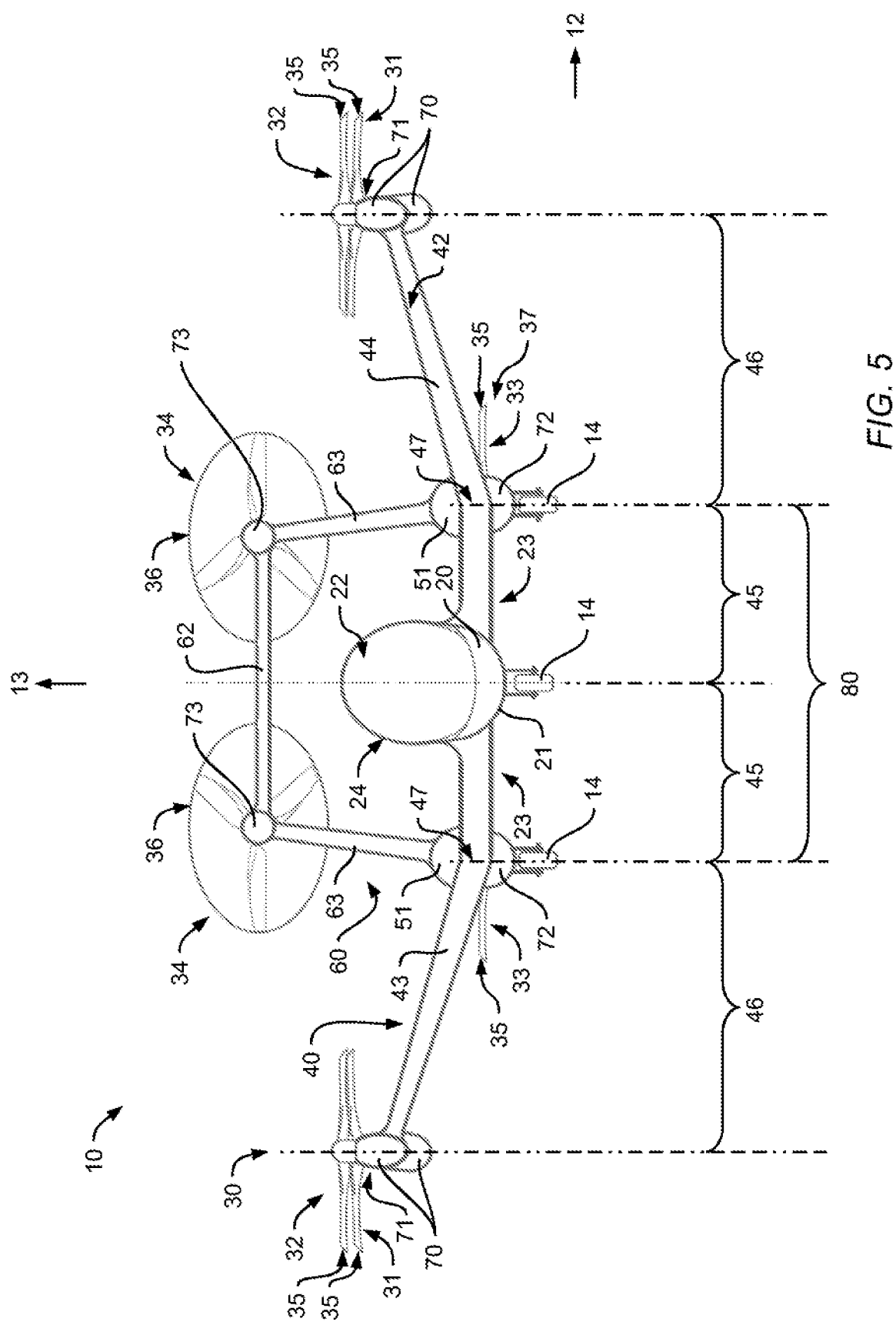
FIG. 5 shows a front view of the multirotor aircraft of FIG. 4 with the thrust producing units assembly and the wing.

FIG. 5 shows the VTOL multirotor aircraft 10 of FIG. 4 for further illustrating the empennage 60, which according to FIG. 4 comprises the vertical planes 63 and the horizontal plane 62. Illustratively, each rear wing pod 73 connects one of the vertical planes 63 to the horizontal plane 62.

Figure 6:
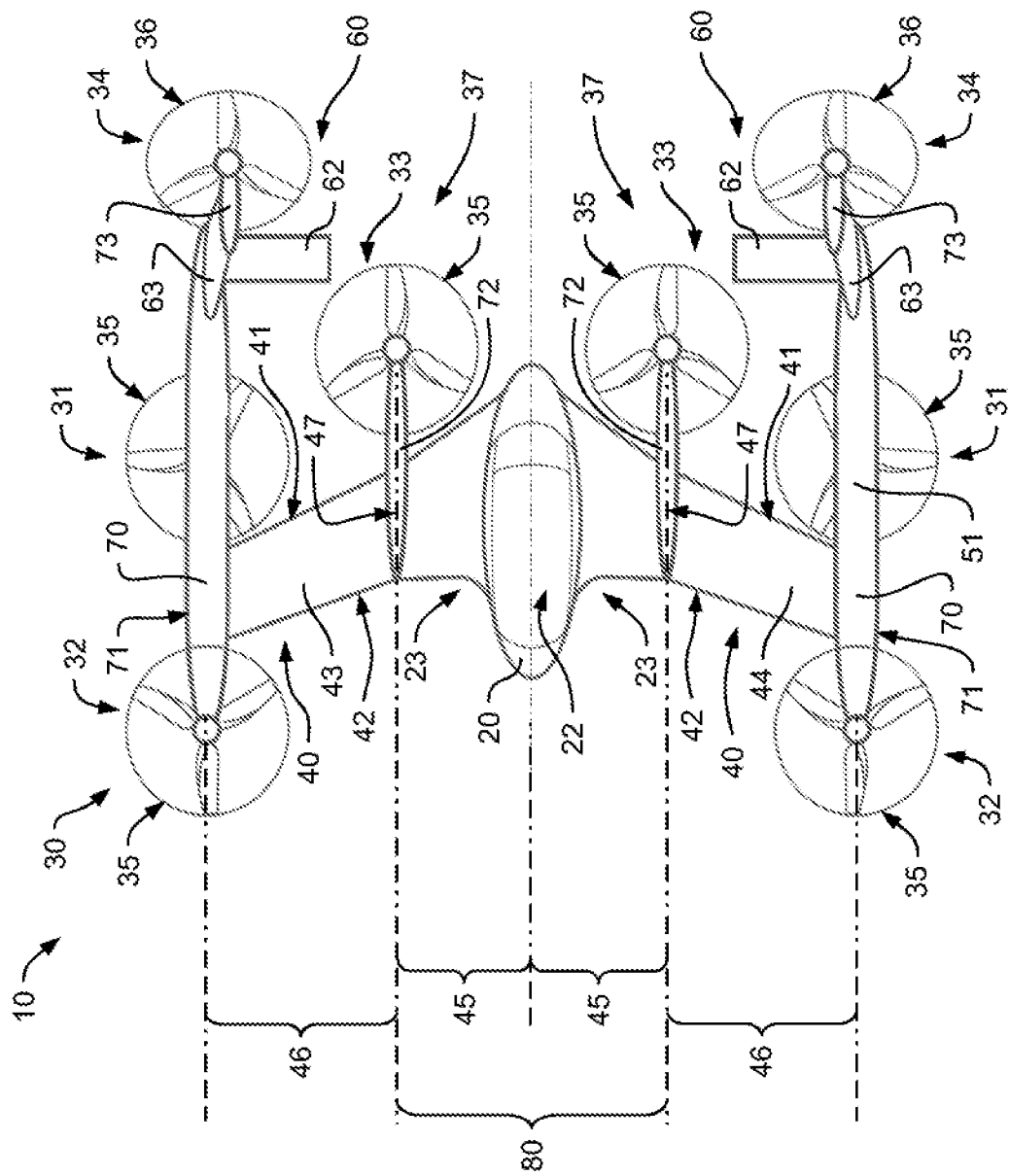
FIG. 6 shows a top view of a multirotor aircraft with a thrust producing units assembly and a wing in accordance with some embodiments.

FIG. 6 shows the VTOL multirotor aircraft 10 of FIG. 1 to FIG. 3 with the fuselage 20, the thrust producing units assembly 30 that comprises the thrust producing units sub-assembly 37, the forward-swept wing 40 that comprises the portside half wing 43 and the starboard side half wing 44, and the empennage 60. Each one of the portside and starboard side half wings 43, 44 comprises inboard and outboard sections 45, 46, which are respectively interconnected at associated transition regions 47. The fuselage 20 forms the cabin 22, adjacent to which the boarding zone 23 is provided.

However, in contrast to FIG. 1 to FIG. 3, the VTOL multirotor aircraft 10 is now exemplarily provided with two lateral booms 51 instead of the single tail boom 50 of FIG. 1 to FIG. 3. Accordingly, the empennage 60 is now exemplarily mounted to the two lateral booms 51.

More specifically, a first one of the lateral booms 51 is illustratively mounted at the wing tip 71 of the portside half wing 43 and a second one of the lateral booms 51 is illustratively mounted at the wing tip 71 of the starboard side half wing 44. The lateral booms 51 exemplarily implement the outboard wing pods 70 that are provided at the wing tips 71 according to FIG. 1 to FIG. 3.

Accordingly, the lateral booms 51 preferably support the thrust producing units 31, 32 of the thrust producing units assembly 30. Illustratively, the thrust producing units 31 are arranged below the lateral booms 51 and the thrust producing units 31 are arranged above the lateral booms 51.

Furthermore, according to FIG. 4 and FIG. 5, each one of the lateral booms 51 is preferably connected to an associated vertical rear plane 63, which is preferentially provided at a respective aft portion of the corresponding one of the lateral booms 51 and connected to an associated one of the rear wing pods 73, which supports one of the thrust producing units 34. Each vertical rear plane 63 is preferably connected to a separate horizontal plane 62. In other words, in contrast to FIG. 4 and FIG. 5, the vertical rear planes 63 are preferably not interconnected by means of a single horizontal rear plane.

Figure 7:
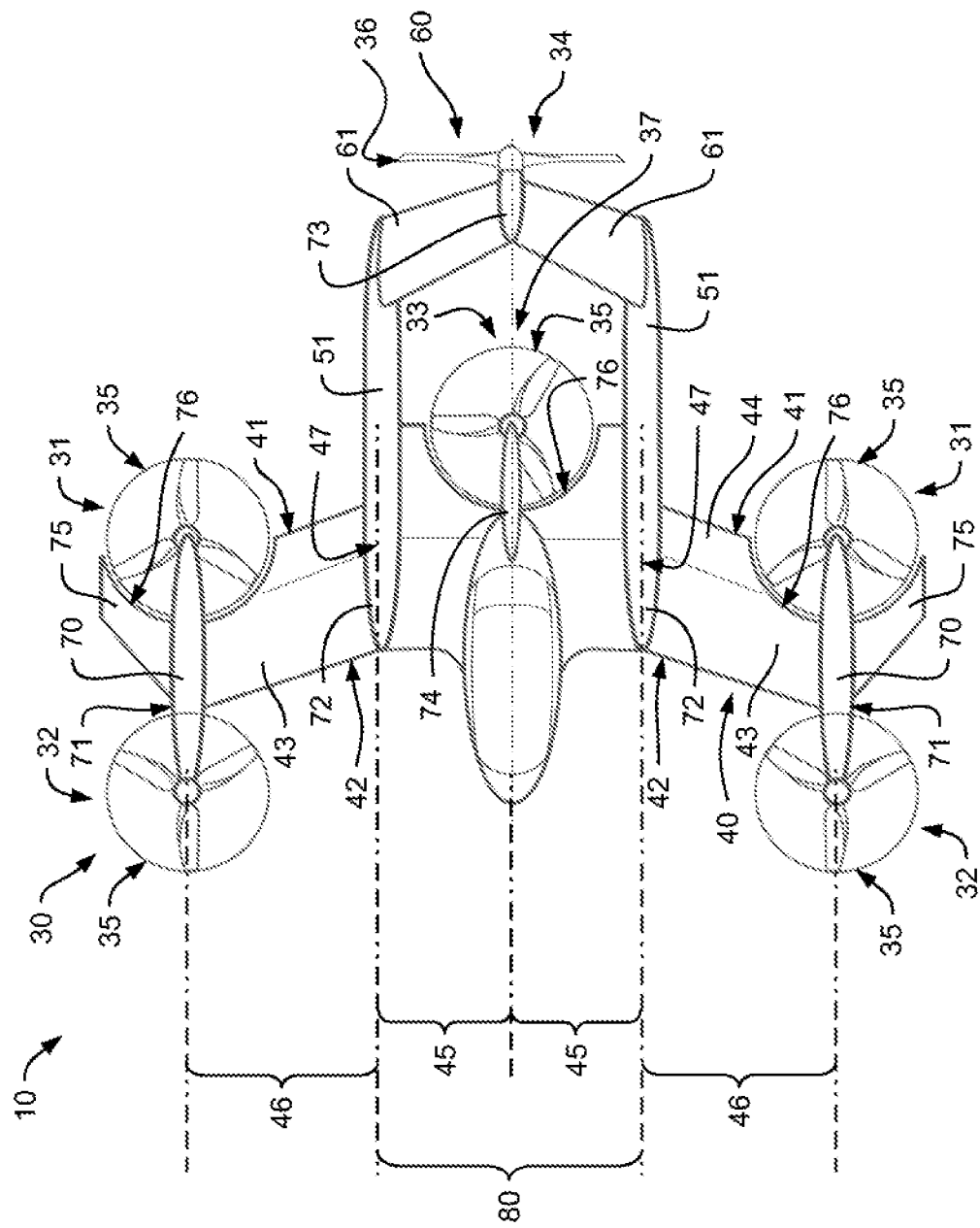
FIG. 7 shows a top view of a multirotor aircraft with a thrust producing units assembly and a wing in accordance with some embodiments.

FIG. 7 shows the VTOL multirotor aircraft 10 of FIG. 4 and FIG. 5 with the fuselage 20, the thrust producing units assembly 30 that comprises the thrust producing units sub-assembly 37, the forward-swept wing 40 that comprises the portside half wing 43 and the starboard side half wing 44, the two lateral booms 51, and the empennage 60. Each one of the portside and starboard side half wings 43, 44 comprises a respective inboard sections 45, both of which form the central wing region 80.

However, in contrast to FIG. 4 and FIG. 5, the thrust producing units sub-assembly 37 of the VTOL multirotor aircraft 10 now only comprises a single one of the two thrust producing units 33 of FIG. 4 and FIG. 5. The single one of the two thrust producing units 33 is preferably supported by an associated central wing pod 74 instead of the two lateral booms 51. According to one aspect, the single one of the two thrust producing units 33 is provided with an associated shrouding 76, which is exemplarily embodied by the inboard sections 45 as a partial shrouding.

Likewise, the thrust producing units 31 of the thrust producing units assembly 30, which are arranged at the wing tips 71 of the forward-swept wing 40, may also be provided with associated shroudings 76. By way of example, these shroudings 76 are embodied by the forward-swept wing 40.

Furthermore, also in contrast to FIG. 4 and FIG. 5, the wing tips 71 of the portside half wing 43 and the starboard side half wing 44 are now according to one aspect provided with winglets 75. However, it should be noted that the winglets 75 may be applied to each configuration of the VTOL multirotor aircraft 10 shown in any one of FIG. 1 to FIG. 9.

Moreover, also in contrast to FIG. 4 and FIG. 5, the lateral booms 51 are now preferably interconnected by the rear planes 61 according to FIG. 1 to FIG. 3, which are now in contrast to FIG. 1 to FIG. 3, however, provided in inverted V-tail configuration. Accordingly, only a single one of the rear wing pods 73 is now provided at a respective tip formed by the rear planes 61 in inverted V-tail configuration. This single one of the rear wing pods 73 illustratively only supports a single one of the thrust producing units 34 of the thrust producing units assembly 30.

Figure 8:
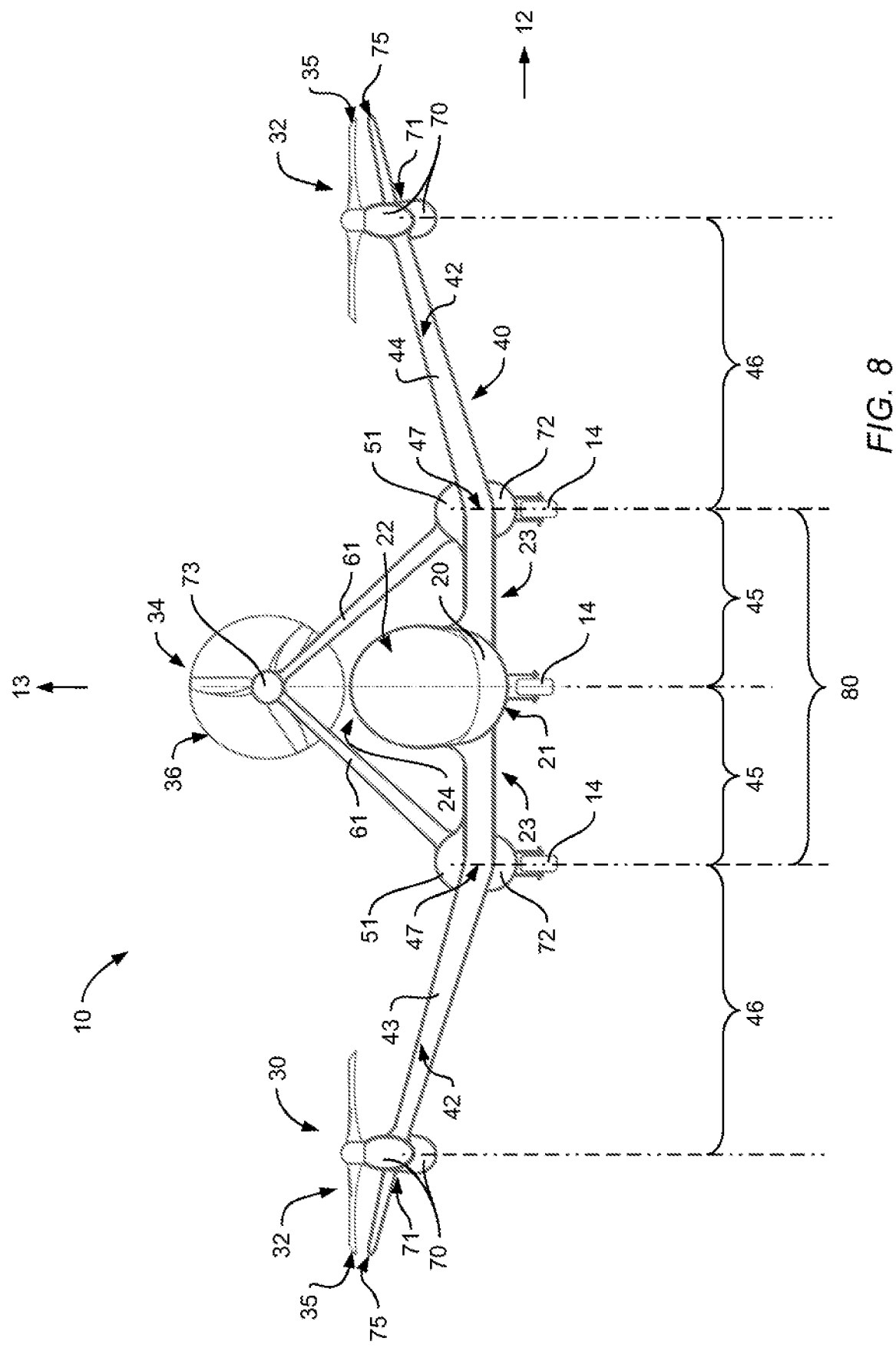
FIG. 8 shows a front view of the multirotor aircraft of FIG. 7 with the thrust producing units assembly and the wing.

FIG. 8 shows the VTOL multirotor aircraft 10 of FIG. 7 for further illustrating the empennage 60, which according to FIG. 7 comprises the rear planes 61 in inverted V-tail configuration. FIG. 8 also further illustrates the single rear wing pod 73 that supports the single thrust producing unit 34.

Figure 9:
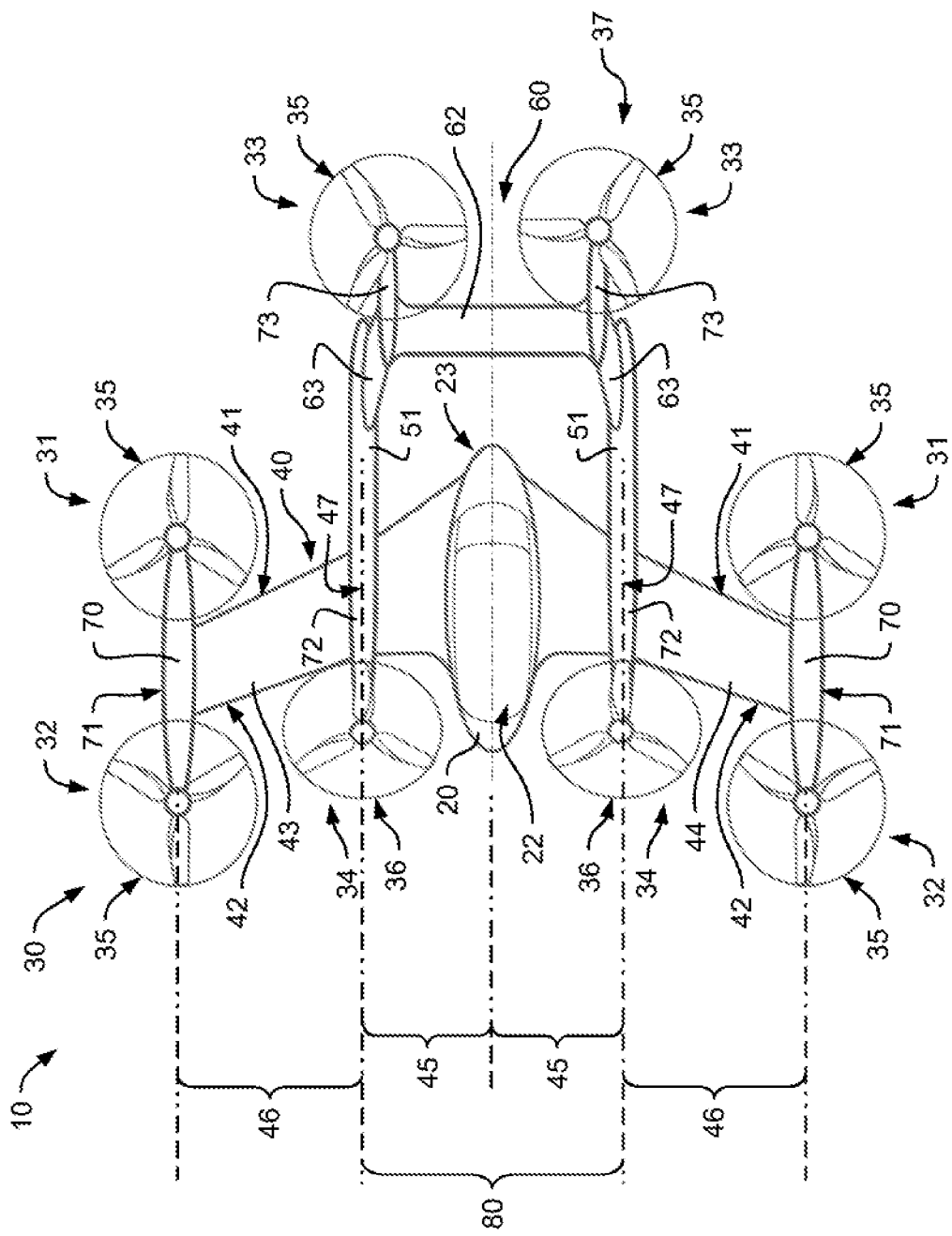
FIG. 9 shows a top view of a multirotor aircraft with a thrust producing units assembly and a wing in accordance with some embodiments.

FIG. 9 shows the VTOL multirotor aircraft 10 of FIG. 4 and FIG. 5 with the fuselage 20, the thrust producing units assembly 30 that comprises the thrust producing units sub-assembly 37, the forward-swept wing 40 that comprises the portside half wing 43 and the starboard side half wing 44, the two lateral booms 51, and the empennage 60. The empennage 60 is mounted to the lateral booms 51 which implement the inboard wing pods 72. Each one of the lateral booms 51 is connected to one of the vertical rear planes 63, which in turn are preferably interconnected by means of the horizontal rear plane 62. Each vertical rear plane 63 is provided with an associated one of the rear wing pods 73.

However, in contrast to FIG. 4 and FIG. 5, the thrust producing units 33 of the thrust producing units sub-assembly 37 of the VTOL multirotor aircraft 10 are now supported by the rear wing pods 73, while the thrust producing units 34 of the thrust producing units assembly 30, which are provided for producing forward thrust in operation, are now supported by the inboard wing pods 72 provided at the transition regions 47 of the forward-swept wing 40. More specifically, the thrust producing units 34 are arranged near the leading edge 42 of the forward-swept wing 40, preferably in front of the forward-swept wing 40. This configuration is advantageously enabled by providing the boarding zone 23 of the VTOL multirotor aircraft 10 at least essentially on the leading edge 41 of the forward-swept wing 40 in the central wing region 80.

It should be noted that in FIG. 1 to FIG. 6, as well as FIG. 8 and FIG. 9 exactly eight thrust producing units are illustrated. Subsequently, with respect to FIG. 7 and FIG. 8, only six thrust producing units are illustrated. Thus, it should be clear that the inventive VTOL multirotor aircraft 10 preferably comprises at least thrust producing units, but may be provided with more or less than eight thrust producing units depending on an intended, e. g. application-specific implementation, in particular with respect to the boarding zone 23. Furthermore, as shown in FIG. 1 to FIG. 6 as well as FIG. 8 and FIG. 9, the thrust producing unit sub-assembly 37 preferably comprises two thrust producing units, but may instead comprise more or less than the two thrust producing units, as exemplarily illustrated in FIG. 6 and FIG. 7.

REFERENCE LIST

10 Multirotor aircraft
11 Aircraft longitudinal axis resp. length direction and forward flight direction
12 Aircraft lateral axis resp. width direction
13 Aircraft vertical axis resp. height direction and vertical take-off direction
14 Landing gear
20 Aircraft fuselage
21 Lower region resp. bottom of the aircraft
22 Aircraft cabin
23 Boarding zone
24 Upper region resp. top of the aircraft
30 Thrust producing units assembly
31, 32, 33, 34 Thrust producing units
35 Lift rotor disc
36 Forward or backward thrust rotor disc
37 Thrust producing units sub-assembly
40 Forward-swept wing
41 Trailing edge
42 Leading edge
43 Portside half wing
44 Starboard side half wing
45 Inboard section
46 Outboard section
47 Transition region
48, 49 Quarter chord lines
50 Tail boom
51 Lateral booms
60 Empennage
61 Rear planes
62 Horizontal rear plane
63 Vertical rear plane
70 Outboard wing pods
71 Wing tips
72 Inboard wing pods
73 Rear wing pods
74 Central wing pod
75 Winglets
76 Partial shroudings
80 Central wing region
α, β Sweep angles of the quarter chord lines
θ Dihedral angle of outboard section of the wing

What is claimed is:

1. A multirotor aircraft that is adapted for vertical take-off and landing, comprising a fuselage, a thrust producing units assembly that is provided for producing thrust in operation, and a forward-swept wing that comprises a portside half wing and a starboard side half wing, each one of the portside and starboard side half wings comprising an inboard section that is connected to the fuselage and an outboard section that forms a wing tip, wherein the inboard sections of the portside and starboard side half wings form a central wing region, wherein each one of the portside and starboard side half wings is connected in the region of its wing tip to an associated outboard wing pod, wherein each one of the associated outboard wing pods supports at least two non-tiltably mounted thrust producing units of the thrust producing units assembly that are provided for generating lift at least during vertical taking-off and landing, wherein the associated outboard wing pod of the portside half wing is provided with a first and a second thrust producing unit, the first thrust producing unit being arranged near a trailing edge of the portside half wing and the second thrust producing unit being arranged near a leading edge of the portside half wing, wherein the associated outboard wing pod of the starboard side half wing is provided with a third and a fourth thrust producing unit, the third thrust producing unit being arranged near a trailing edge of the starboard side half wing and the fourth thrust producing unit being arranged near a leading edge of the starboard side half wing, wherein a thrust producing units sub-assembly of the thrust producing units assembly is provided in the central wing region near a trailing edge of the forward-swept wing for generating lift at least during vertical taking-off and landing;

wherein at least one thrust producing unit of the thrust producing units assembly is fixedly inclined with respect to a longitudinal axis of the multirotor aircraft for generating forward thrust at least during cruise operation of the multirotor aircraft;

wherein, the multirotor aircraft comprises an empennage, and the at least one thrust producing unit of the thrust producing units assembly that is fixedly inclined with respect to the longitudinal axis of the multirotor aircraft is non-tiltably mounted to the empennage; and wherein the multirotor aircraft comprises a tail boom that is connected to the fuselage, wherein the empennage is mounted to the tail boom; wherein the fuselage having upper and lower regions, the inboard sections and the central wing region is attached to the lower region; wherein the wing tips of the portside half wing and of the starboard side half wing are in a height direction of the multirotor aircraft arranged at a height levelled to or above an upper region of the fuselage; each one of the thrust producing units supported at the wing tips by the associated outboard wing pods is arranged above the associated outboard wing pod and above the fuselage; wherein the multirotor aircraft having a maximum spanwise dimension and the fuselage having a front end and a rear end, at least two of the thrust producing units supported at wing tips by the associated outboard wing pod and towards a front end of the associated outboard wing pod, are arranged longitudinally ahead of the front end of the fuselage and transversally at least partly at the maximum spanwise dimension of the multirotor aircraft; and the fuselage having a boarding zone by the front end that is adapted to enable boarding of passengers onboard the multirotor aircraft, the boarding zone is free of obstructive components associated with the thrust producing units assembly at wing tips and ahead of associated outboard wing pod.

2. The multirotor aircraft of claim 1,
wherein each one of the portside and starboard side half wings comprises a transition region that interconnects its inboard and outboard sections and that is connected to an associated inboard wing pod, wherein the central wing region comprises both the transition region of the portside half wing and the transition region of the starboard side half wing, wherein the associated inboard wing pod of the portside half wing is provided with a non-tiltably mounted first thrust producing unit of the thrust producing units sub-assembly that is arranged near the trailing edge of the portside half wing, and wherein the associated inboard wing pod of the starboard side half wing is provided with a non-tiltably mounted second thrust producing unit of the thrust producing units sub-assembly that is arranged near the trailing edge of the starboard side half wing.

3. The multirotor aircraft of claim 1,
wherein the thrust producing units sub-assembly comprises a non-tiltably mounted fifth thrust producing unit that is arranged on a longitudinal axis of the aircraft in the central wing region near a trailing edge of the forward-swept wing.

4. The multirotor aircraft of claim 1,
wherein the outboard section of the portside half wing is upwardly inclined by a predetermined positive dihedral angle relative to the inboard section of the portside half wing, and the outboard section of the starboard side half wing is upwardly inclined by the predetermined positive dihedral angle relative to the inboard section of the starboard side half wing.

5. The multirotor aircraft of claim 4,
wherein the predetermined positive dihedral angle has a value that lies in a range from 0° to 60°.

6. The multirotor aircraft of claim 1,
wherein the wing tips of the portside half wing and the starboard side half wing are connected to winglets.

7. The multirotor aircraft of claim 1,
wherein at least the first and third thrust producing units and/or at least one thrust producing unit of the thrust producing units sub-assembly are provided with associated shroudings.

8. The multirotor aircraft of claim 7,
wherein at least one of the associated shroudings is a partial shrouding.

9. The multirotor aircraft of claim 7,
wherein the associated shroudings are formed by the forward-swept wing.

10. The multirotor aircraft of claim 1, wherein each one of the portside and starboard side half wings comprises a transition region that interconnects its inboard and outboard sections and that is connected to an associated inboard wing pod, wherein the central wing region comprises both the transition region of the portside half wing and the transition region of the starboard side half wing, wherein the associated inboard wing pod of the portside half wing is provided with a non-tiltably mounted first thrust producing unit of the thrust producing units sub-assembly that is arranged near the trailing edge of the portside half wing, and wherein the associated inboard wing pod of the starboard side half wing is provided with a non-tiltably mounted second thrust producing unit of the thrust producing units sub-assembly that is arranged near the trailing edge of the starboard side half wing, further comprising laterally-spaced longitudinal booms that respectively form one of the associated inboard wing pods of the portside half wing and the starboard side half wing, wherein the empennage is mounted to the laterally-spaced longitudinal booms.

11. The multirotor aircraft of claim 1, wherein each one of the portside and starboard side half wings comprises a transition region that interconnects its inboard and outboard sections and that is connected to an associated inboard wing pod, wherein the central wing region comprises both the transition region of the portside half wing and the transition region of the starboard side half wing, wherein the associated inboard wing pod of the portside half wing is provided with a non-tiltably mounted first thrust producing unit of the thrust producing units sub-assembly that is arranged near the trailing edge of the portside half wing, and wherein the associated inboard wing pod of the starboard side half wing is provided with a non-tiltably mounted second thrust producing unit of the thrust producing units sub-assembly that is arranged near the trailing edge of the starboard side half wing, further comprising laterally-spaced longitudinal booms that respectively form one of the associated outboard wing pods of the portside half wing and the starboard side half wing, wherein the empennage is mounted to the laterally-spaced longitudinal booms.

12. A multirotor aircraft adapted for vertical take-off and landing, the multirotor aircraft comprising a fuselage, a thrust producing units assembly for producing thrust in operation, and a forward-swept wing comprising a portside half wing and a starboard side half wing, each of the portside and starboard side half wings comprising an inboard section connected to the fuselage and an outboard section forming a wing tip, wherein the inboard sections of the portside and starboard side half wings form a central wing region,
wherein each of the portside and starboard side half wings is connected in the region of its wing tip to an associated longitudinally extending outboard wing pod,
wherein the associated outboard wing pod of the portside half wing is provided with a first and a second non-tiltably mounted thrust producing unit for generating lift at least during vertical taking-off and landing, the first thrust producing unit being arranged adjacent a trailing edge of the portside half wing and the second thrust producing unit being arranged in-front of the first thrust producing unit adjacent a leading edge of the portside half wing, wherein the associated outboard wing pod of the starboard side half wing is provided with a third and a fourth non-tiltably mounted thrust producing unit for generating lift at least during vertical taking-off and landing, the third thrust producing unit being arranged adjacent a trailing edge of the starboard side half wing and the fourth thrust producing unit being arranged longitudinally in-front of the third thrust producing unit adjacent a leading edge of the starboard side half wing, wherein a thrust producing units sub-assembly of the thrust producing units assembly is provided in the central wing region near a trailing edge of the forward-swept wing for generating lift at least during vertical taking-off and landing;

wherein at least one thrust producing unit of the thrust producing units assembly is fixedly inclined with respect to a longitudinal axis of the multirotor aircraft for generating forward thrust at least during cruise operation of the multirotor aircraft;

wherein, the multirotor aircraft comprises an empennage, and the at least one thrust producing unit of the thrust producing units assembly that is fixedly inclined with respect to the longitudinal axis of the multirotor aircraft is non-tiltably mounted to the empennage; and wherein the multirotor aircraft comprises a tail boom connected to the fuselage, wherein the empennage is mounted to the tail boom; wherein the fuselage having upper and lower regions, the inboard sections at the central wing region is attached to the lower region; wherein the wing tips of the portside half wing and of the starboard side half wing are in a height direction of the multirotor aircraft arranged at a height levelled to or above an upper region of the fuselage; each one of the thrust producing units supported at the wing tips by the associated outboard wing pods is arranged above the associated outboard wing pod and above the fuselage; wherein the multirotor aircraft having a maximum spanwise dimension and the fuselage having a front end and a rear end, at least two of the thrust producing units supported at wing tips by the associated outboard wing pod and towards a front end of the associated outboard wing pod, are arranged longitudinally ahead of the front end of the fuselage and transversally at least partly at the maximum spanwise dimension of the multirotor aircraft; and the fuselage having a boarding zone by the front end that is adapted to enable boarding of passengers onboard the multirotor aircraft, the boarding zone is free of obstructive components associated with the thrust producing units assembly at wing tips and ahead of associated outboard wing pod.

13. The multirotor aircraft of claim 12,
wherein each one of the portside and starboard side half wings comprises a transition region that interconnects its inboard and outboard sections and that is connected to an associated inboard wing pod, wherein the central wing region comprises both the transition region of the portside half wing and the transition region of the starboard side half wing, wherein the associated inboard wing pod of the portside half wing is provided with a non-tiltably mounted first thrust producing unit of the thrust producing units sub-assembly that is arranged near the trailing edge of the portside half wing, and wherein the associated inboard wing pod of the starboard side half wing is provided with a non-tiltably mounted second thrust producing unit of the thrust producing units sub-assembly that is arranged near the trailing edge of the starboard side half wing.

14. The multirotor aircraft of claim 12,
wherein the outboard section of the portside half wing is upwardly inclined by a predetermined positive dihedral angle relative to the inboard section of the portside half wing, and the outboard section of the starboard side half wing is upwardly inclined by the predetermined positive dihedral angle relative to the inboard section of the starboard side half wing.

15. The multirotor aircraft of claim 14,
wherein the predetermined positive dihedral angle has a value that lies in a range from 0° to 60°.

16. The multirotor aircraft of claim 12, wherein each one of the portside and starboard side half wings comprises a transition region that interconnects its inboard and outboard sections and that is connected to an associated inboard wing pod, wherein the central wing region comprises both the transition region of the portside half wing and the transition region of the starboard side half wing, wherein the associated inboard wing pod of the portside half wing is provided with a non-tiltably mounted first thrust producing unit of the thrust producing units sub-assembly that is arranged near the trailing edge of the portside half wing, and wherein the associated inboard wing pod of the starboard side half wing is provided with a non-tiltably mounted second thrust producing unit of the thrust producing units sub-assembly that is arranged near the trailing edge of the starboard side half wing, further comprising laterally-spaced longitudinal booms that respectively form one of the associated inboard wing pods of the portside half wing and the starboard side half wing, wherein the empennage is mounted to the laterally-spaced longitudinal booms.

17. The multirotor aircraft of claim 12, wherein each one of the portside and starboard side half wings comprises a transition region that interconnects its inboard and outboard sections and that is connected to an associated inboard wing pod, wherein the central wing region comprises both the transition region of the portside half wing and the transition region of the starboard side half wing, wherein the associated inboard wing pod of the portside half wing is provided with a non-tiltably mounted first thrust producing unit of the thrust producing units sub-assembly that is arranged near the trailing edge of the portside half wing, and wherein the associated inboard wing pod of the starboard side half wing is provided with a non-tiltably mounted second thrust producing unit of the thrust producing units sub-assembly that is arranged near the trailing edge of the starboard side half wing, further comprising laterally-spaced longitudinal booms that respectively form one of the associated outboard wing pods of the portside half wing and the starboard side half wing, wherein the empennage is mounted to the laterally-spaced longitudinal booms.

18. The multirotor aircraft of claim 1,
wherein the boarding zone is arranged in height direction of the multirotor aircraft at least partly above of at least one of the inboard section of the portside and starboard side half wings connected to the lower region of the fuselage.

* * * * *